No. 637,950. Patented Nov. 28, 1899.
J. WEICHMANN.
INHALING APPARATUS.
(Application filed Dec. 31, 1897.)
(No Model.) 3 Sheets—Sheet 1.
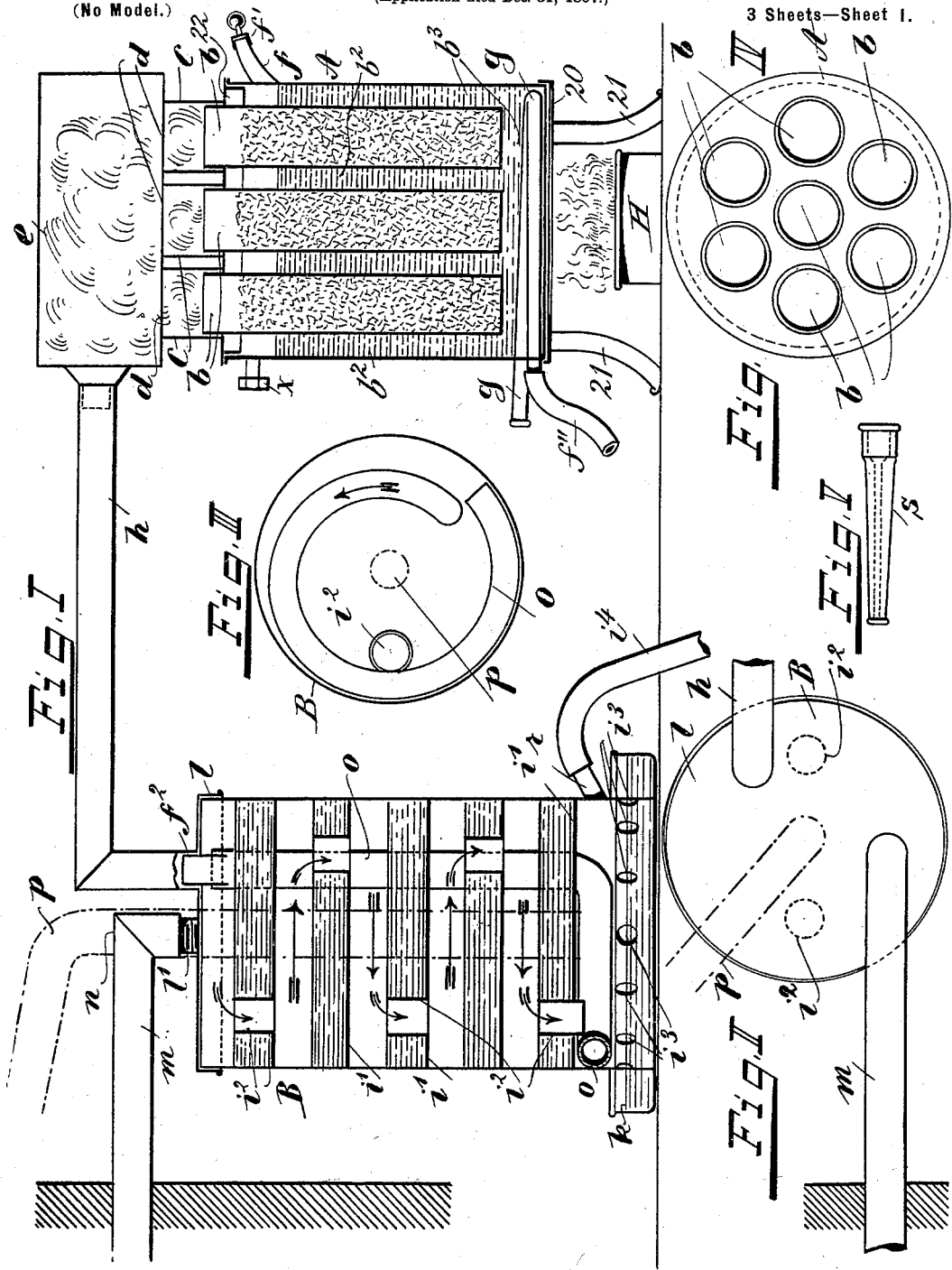

No. 637,950. Patented Nov. 28, 1899.
J. WEICHMANN.
INHALING APPARATUS.
(Application filed Dec. 31, 1897.)
(No Model.) 3 Sheets—Sheet 2.
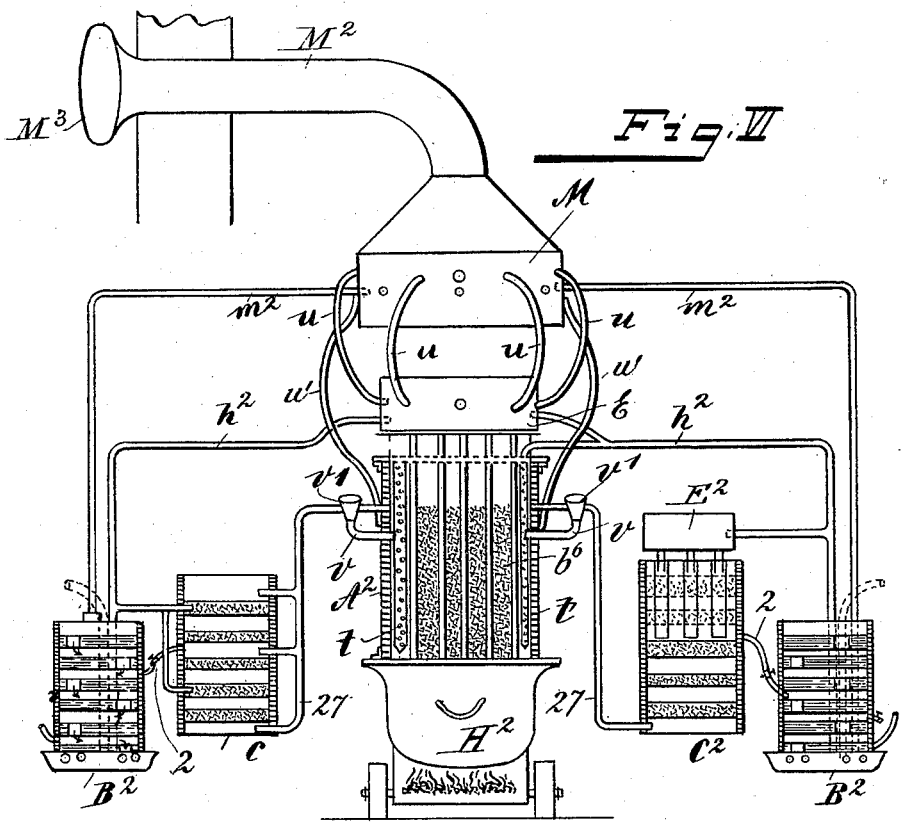
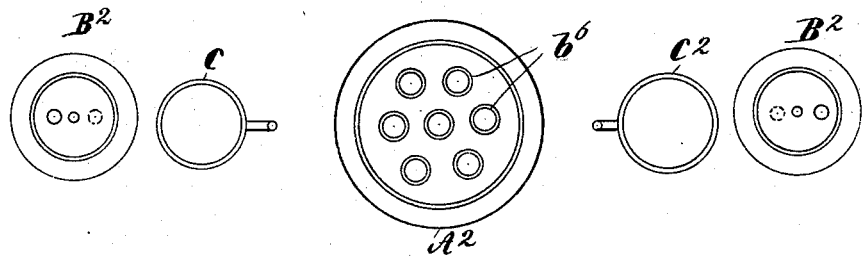
Witnesses:
Raymund Gloetzner
Mitford C. Massie.
Inventor.
Johan Weichmann
by Ma Hingü
Attorney No. 637,950. Patented Nov. 28, 1899.
J. WEICHMANN.
INHALING APPARATUS.
(Application filed Dec. 31, 1897.)
(No Model.) 3 Sheets—Sheet 3.
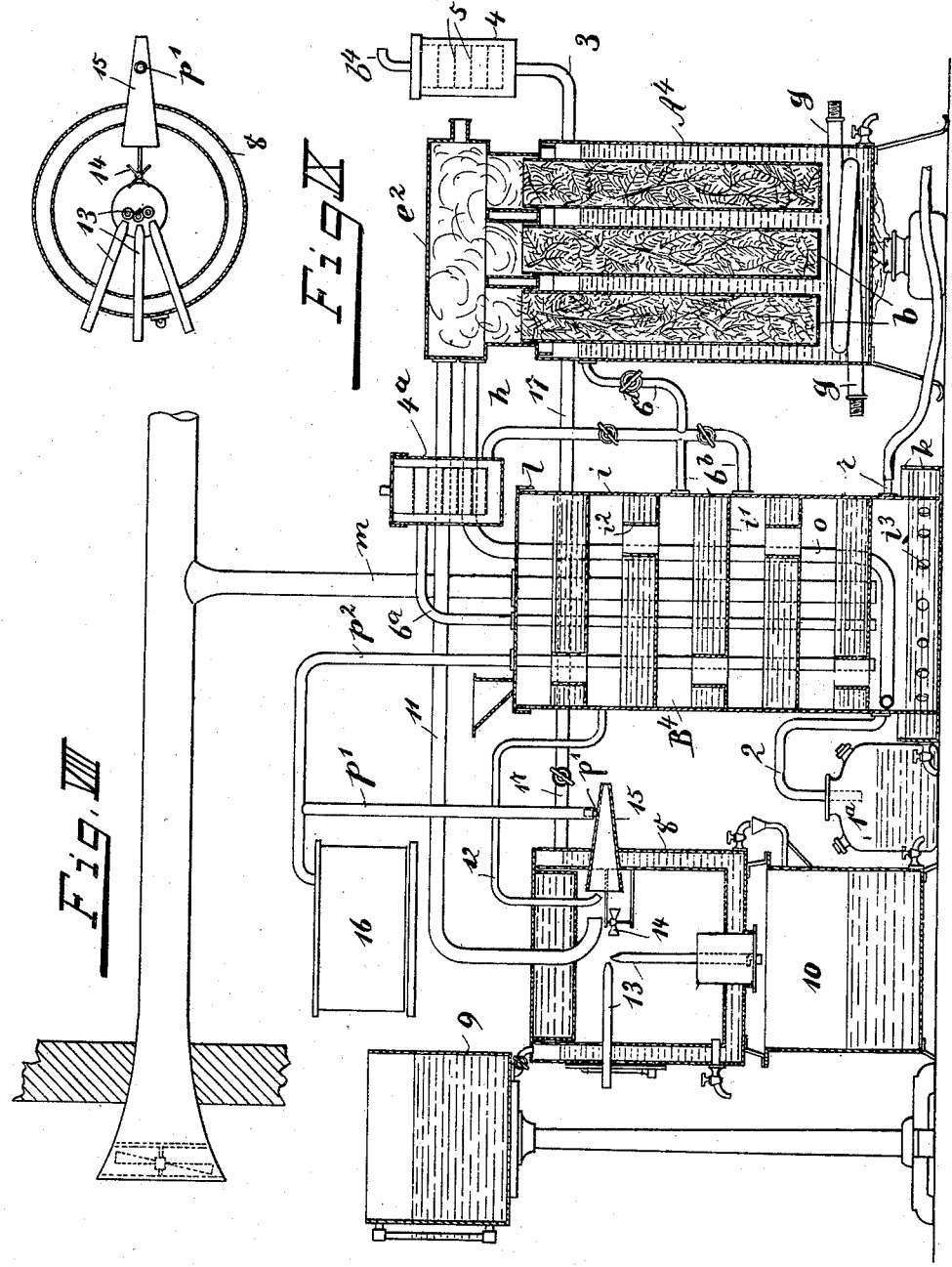
Witnesses:
Raymund Gloetzner
Mitford C. Masie
Inventor:
Johann Weichmann
by Max Hoga
Attorney

UNITED STATES PATENT OFFICE.

JOHANN WEICHMANN, OF MUNICH, GERMANY.

INHALING APPARATUS.

SPECIFICATION forming part of Letters Patent No. 637,950, dated November 28, 1899.

Application filed December 31, 1897. Serial No. 664,857. (No model.)

*To all whom it may concern:*

Be it known that I, JOHANN WEICHMANN, a subject of the King of Bavaria, and a resident of Munich, Kingdom of Bavaria, Germany, have invented certain new and useful Improvements in Inhaling Apparatuses, of which the following is a full, clear, and exact description.

This invention relates to volatilizing and vapor purifying and mixing apparatus; and it consists, substantially, in such features of improvement as will hereinafter be more particularly described.

The invention has for its object to provide simple and effective apparatus for the volatilization of different substances for use in inhalation and for the purposes of fumigation of rooms, hospital-wards, and such like places.

The invention also has for its object to provide means for purifying the vapors produced in the volatilizer, and, furthermore, to provide means for mixing with such vapors other vapors or substances, according to the nature of the requirements.

The above objects are attained by the means illustrated in the accompanying drawings, in which—

Figure 1 is a vertical sectional elevation of both the volatilizing and purifying apparatus, some of the parts being in broken lines and others being in elevation. Fig. 2 is a top plan view of the cooling and purifying apparatus, and Fig. 3 is a bottom plan view thereof with the water-pan removed. Fig. 4 is a top plan view of the volatilizer with the vapor-collector removed, and Fig. 5 is a detail view. Fig. 6 is a similar view to Fig. 1 of a larger plant embodying a single volatilizer and several cooling and purifying vessels and their appurtenances. Fig. 7 is a diagrammatic top plan view of the several vessels employed in the preceding figure. Fig. 8 is also a similar view to Fig. 1, showing the arrangement of other vessels in connection with the volatilizer and purifying vessels and also the use or employment of an atomizing device. Fig. 9 is a detail sectional view.

Preliminary to a more detailed description it may be stated that my invention has reference more particularly to apparatus for the volatilization of the oils of various kinds of plants, such as pine leaves and twigs, and that the construction and arrangement are such as to enable the vapors produced to be discharged directly into the room or other apartment, if desired, or else first cooled and then discharged in the percentage or quantity necessary. The construction and arrangement are such also as to enable the pine-vapors to be united with other vapors or substances— such as pure air, ozone, or steam—and the said pine-vapors or mixed vapors can be inhaled directly from the apparatus, if desired, or else conducted away by means of suitable pipes or tubing. In some instances also I discharge the pine-vapors or the mixed vapors in the form of a spray, and for which purpose I employ a suitable atomizer and blower. For extensive purposes, such as is required in hospital-wards and like places, I modify the arrangement somewhat, but do not alter the construction or mode of operation of any of the main or essential elements of the apparatus.

Referring to the accompanying drawings, and more particularly to Figs. 1 to 5, inclusive, A represents my improved volatilizer, which, as shown, consists of an outer cylindrical vessel having a closed bottom 20 and provided with legs 21 for supporting the same at a suitable height or elevation from the floor. Beneath the vessel is located a spirit-lamp H for heating the contents thereof, and suspended within the vessel from the top are a number of tubes or retorts $b$, which are each closed at the bottom and separated from each other and from the sides of the vessel by means of spaces $b^2$, and between the tubes and the bottom 20 of the vessel is also a space $b^3$. The said vessel is closed at the top by means of a tight-fitting lid or cover 22, and the upper ends of the tubes or retorts $b$ project through and slightly above the lid. If desired, the said lid and tubes may be united by a suitable solder or packing, so that the tubes can be conveniently lifted from the vessel whenever desired.

In one side of the vessel A is a closed steam-inlet pipe $x$, and projecting from the other side is a spout or nozzle $f$, that is closed by a removable cap or cover $f'$. Located in the bottom of said vessel is a pipe $g$, bent into circular form and having both of its ends projecting through the side of the vessel, and to one of such ends is attached a rubber tube $f'''$. This pipe is for the admission of air, which becomes heated and which may be utilized for treating various diseases of the ear or throat or other parts of the body.

The tubes or retorts $b$ are filled or partially filled with the pine-leaves or other substances to be volatilized and the surrounding space in the vessel A is filled with water to about the height shown. The lamp or other burner is then lighted, whereupon the water in the vessel becomes heated and likewise the tubes and their contained substances and the essential oil of the plant is converted into vapor, which can be discharged into an apartment or room in any desired percentage or quantity. Such vapor could be allowed to escape directly from the open ends of the tubes; but preferably I employ a collecting vessel $e$ therefor above the tubes and connecting therewith by means of short tubes $c$. Said vapor-collector can, if desired, be provided with one or more tubes leading therefrom for the purposes of inhalation of the vapor, and it can also be provided with any suitable means for permitting the escape or discharge of the vapor for fumigating purposes. As shown in Fig. 5, $s$ designates a suitable form of mouthpiece, which may be attached to a flexible or other tube employed for inhalation purposes.

Instead of employing hot water as the heating medium for the tubes or retorts $b$ I can employ steam from any source, which may be passed into the vessel through the inlet-pipe $x$. In such case I can then discharge steam from the spout $f$ whenever it may be desired to moisten the air of the room, and I can also attach a tube to said spout for the purpose of inhalation of the steam or for conveying it to some part of the body to be treated.

For the purpose of absorbing the moisture from the vapors generated in the tubes or retorts $b$ I locate either at the upper ends of the tubes or in the bottom of the collector $c$ suitable sieves $d$, of some fibrous absorbent material—such as hair, for instance—which also serves to catch or restrain any solid particles of the pine-leaves or other substances which may be carried upward with the vapors. By such means the vapor escapes to the collector in a dry and purified condition, and there is no danger likely to arise even in the direct inhalation thereof from the collector.

Instead of discharging the vapors either from the tubes or from the collector directly I prefer to first cool the same and also to precipitate therefrom such heavy or solid particles as may not have been restrained or caught by the sieves $d$. For this purpose I employ a suitable auxiliary to the volatilizer A, which may be termed a "combined purifying and mixing vessel," inasmuch as certain means are employed therewith for mixing ozone or purified air or other substances with the vapors of the pine-oil or other substances, either as may be desired. Thus B represents the combined purifying and mixing vessel, which is also preferably cylindrical in shape and which is closed at the bottom and provided at the top with a close-fitting lid or cover $l$. The said vessel is divided into a number of compartments by means of horizontal partitions or trays $i'$, and the said compartments are in communication one with the other by means of vertical pipes or tubes $i^2$, which are arranged to alternate with each other with respect to their positions in the vessel. The said partitions or trays $i'$ are filled with water or other medium for the purpose of cooling and moistening air or other substances which can be mixed with the pine-oil vapors, as desired and as will be explained.

In the sides of the vessel B, at or near the bottom thereof, is formed a series of holes or openings $i^3$, and surrounding said vessel at the bottom is a pan or trough $k$, the edge of which extends somewhat above the upper edge of said holes or openings $i^3$. A spout or nozzle $r$ projects from the side of the said vessel B at a point above the openings $i^3$, and to which a flexible tube $i^4$ is attached for the purpose of direct inhalation of the purified vapors. The said pan $k$, as well as the vessel B, is filled with water to a height sufficient to seal or cover the openings $i^3$, and it is evident that any vapors passing to the bottom of the said vessel cannot escape except through the spout or nozzle $r$.

Leading from the vapor-collector $e$ and connecting with a short tube $f^2$, fitting in the lid or cover $l$ of the vessel B, is a pipe $h$, and this pipe by means of the said connection $f^2$ communicates with the upper end of a pipe $o$, which extends from the uppermost to the lowermost compartment in the vessel. The lower end of said pipe is open, so as to deliver the pine-oil or other vapors into the lowermost compartment directly at the surface of the water contained therein. Said pipe $o$ instead of passing straight down through the partitions or trays $i'$ can in some instances be coiled at different parts of its length, so as to extend at least once around the inner side of the vessel before passing through the successive trays. It will be noted that the lower open end of said pipe terminates at a diametrically opposite point to that at which the spout or nozzle $r$ is attached, so that before reaching the outlet to the nozzle the vapors are compelled to pass over the entire surface of the water in the bottom or lowermost compartment of the vessel. In this way the said vapors are cooled, and any solid particles therein will be precipitated by pressure of the liquid. The vapors are thus purified and rendered capable of ready inhalation without harmful results.

It is sometimes desirable to mix other vapors or substances with the pine-oil vapors—such as ozone, for instance—and for this purpose I also pass through the trays $i'$ a pipe $p$, also reaching to the lowermost compartment of the vessel B, and it will be seen that the ozone passing through the pipe $p$ will become mixed with the other vapors and be carried off therewith through the spout or nozzle $r$. It is also desirable at times to mix pure air with the vapors or with the admixture of vapors, and for this purpose I connect with the lid $l$ an air-pipe $m$, which communicates at its inner end with the uppermost compartment of the vessel B, the outer end of said pipe leading to the open air in any suitable manner. The said pipe $m$ is provided, preferably, at its inner end with a sieve or mass of antiseptic material $l'$, so as to destroy any germs in the air passing through the pipe, and after leaving the pipe the air passes from one compartment of the vessel B to the other, as indicated by the arrows, and is thus cooled and is also deprived of solid particles of matter by contact with the water in the trays.

From the above description, taken in connection with Figs. 1 to 5 of the drawings, it will be seen that my improved volatilizing and purifying apparatus is very effective for the purposes for which the same is intended.

In Figs. 6 and 7 I have shown a somewhat different or modified arrangement which is intended for use in hospital-wards and like places where the requirements are greater. In this arrangement I employ a centrally-arranged volatilizing apparatus $A^2$, which in all essential particulars is the same in construction as the volatilizer shown in Fig. 1. Beneath said vessel $A^2$ is a small heating furnace or kettle $H^2$, which is preferably mounted on wheels or rollers, so as to be readily moved away from the vessel when desired. Arranged in said vessel $A^2$ at the sides are perforated vertical tubes $t$, which serve to collect the products resulting from the partial vaporization of the water which surrounds the tubes or retorts $b^2$ in the vessel, and projecting from the vessel at the sides are upwardly-bent pipes $v$, which are used to let off steam either for the purposes of inhalation or for moistening the atmosphere of the room whenever steam may be employed to heat the substances in the tubes or retorts, as has been mentioned in connection with the steam-inlet pipe $x$, Fig. 1. Said pipes $v$ are provided with funnels $v'$, which serve to collect the water resulting from condensation of the steam, and which water will flow back into the vessel A. The quantity of water condensed is so small as to have no effect upon the steam filling the interior of the vessel around the retorts. In this construction, Figs. 6 and 7, also the vapors of pine-oil or other substances pass into the collector E above the volatilizer $A^2$, and from thence the said vapors pass through tubes $u$ into an air-reservoir M, which is supplied with air by means of a pipe $M^2$, having a funnel-shaped mouth. The pine-oil vapors are thus mixed with air and this mixture is forced through pipes $m^2$ into the bottom compartment of the purifiers $B^2 B^2$. Said purifiers are substantially the same in construction as has already been described with reference to Fig. 1. There are two pipes $h^2$ $h^2$, one of which connects the bottom compartment of one of the purifiers $B^2$ both with one of the tubes or retorts in the vessel $A^2$ and the collector E, and the other of which connects the bottom compartment of the other purifier $B^2$ with the said collector, and thus some of the vapors pass directly from the latter both from the tube and the collector E.

When employing steam in the vessel $A^2$ as the medium for heating the tubes or retorts in said vessel, I sometimes also employ additional volatilizers C $C^2$, which do not differ materially in construction from those already described. One of these, C, is shown without a vapor-collector, while the other, $C^2$, is provided with a collector $E^2$, similarly as already explained. Said additional volatilizers are connected with the vessel $A^2$ by means of pipes 27, which convey steam into and through the layers 1 of pine-leaves, and the vapor arising from such plants is conveyed with steam by other pipes 2 into the purifiers $B^2$ $B^2$, from whence it is passed out either for the purposes of inhalation or fumigation.

In Fig. 8 I have shown still another modified arrangement wherein the construction and arrangement of the volatilizer $A^4$ and the purifier $B^4$ are substantially the same as in Fig. 1, with the exception that the air-delivery pipe $m$ extends nearly to the bottom of the purifier instead of only to the top. In connection with the volatilizer, however, I attach to one side of the same above the water-level therein an upwardly-curved pipe 3, on which is supported a receptacle 4, in which is arranged a series of trays 5, on each of which is placed a quantity of any suitable salts. The upper end of the receptacle 4 is provided with a pipe $b^4$, through which the salts may be inhaled. The evaporation of the salts is assisted by the heat conveyed to the trays by the pipe 3. A similar salts-receptacle $4^a$ is supported by the upper end of a pipe $6^a$, the lower end of which reaches to the lowermost compartment of the purifier $B^4$, where the salts-vapor is conducted and becomes mixed with the pine-oil vapors entering such compartment. Also connecting said receptacle $4^a$ with one of the compartments of said purifier $B^4$ is a pipe $6^b$, and it will be seen that moisture may pass from said compartment and becomes mixed with the salts in said receptacle. Connecting the vapor-collector $e^2$ in this instance with a cooling vessel 8 is a pipe 11, and located in the side of said vessel is a funnel or atomizer 15, before the mouth of which, inside the vessel, are arranged a fan 14 and a pipe-blower 13. The inner end of pipe 11 terminates just before the mouth of said funnel or atomizer, and the said vessel 8 is provided with a double wall, the space between which is kept filled with fresh water from a tank 9. Beneath said vessel is a bucket or receptacle 10, into which the water flows from between said double walls. A pipe 12 leads from the side of vessel $B^4$, and also terminates at the mouth of the funnel 15. This pipe 12 serves to convey some of the moisture naturally arising in the interior of the said vessel $B^4$. A pipe $p'$, connecting with pipe $p^2$, leading ozone from the receptacle 16 to the bottom compartment of vessel $B^4$, is also shown as connecting with the funnel 15 on the outer side of the vessel 8. It will now be seen that the combined mixture of vapors can be forced into the room or other apartment in the form of a spray, and thus may the atmosphere be fumigated and purified. For the purposes of introducing liquid sulfids into the bottom of the vessel $B^4$ a flask $1^a$ of such substance is connected by means of a pipe 2 with the lowermost compartment of said vessel. A pipe 17 connects the double-wall vessel 8 with the interior of vessel $A^4$, and the water may be supplied to said vessel through said pipe from the space between said double walls.

What I claim, and desire to secure by Letters Patent of the United States, is—

1. In an inhaling apparatus, the combination of a volatilizer comprising a closed vessel for containing a heating fluid or mixture, a retort suspended within said vessel for containing fibers of the pine-tree or the like, a vapor-collector communicating with the retort, and a sieve $d$, of hair located at the point of communication between said retort and collector, substantially as described.

2. In an inhaling apparatus, the combination of a volatilizer comprising a closed vessel for containing a heating fluid or substance, retorts suspended within said vessel for containing fibers of the pine-tree or the like, said retorts being open at their upper ends, a vapor-collector communicating with the open ends of the retorts, sieves $d$ of hair located at the points of communication between said retorts and collector, and means for cooling the vapor, substantially as described.

3. In an inhaling apparatus, the combination of a volatilizer comprising a closed vessel for containing a heating fluid or substance, retorts suspended within said vessel for containing fibers of the pine-tree or the like, a vapor-collector communicating with the retorts, and means for cooling and mixing the vapors with air and ozone, substantially as described.

4. In an inhaling apparatus, the combination of a volatilizer comprising a closed vessel for containing a heating fluid or substance, retorts for containing the substance to be volatilized, a vapor-collector communicating with the retorts, sieves $d$ at the points of communication of said retorts with the collector, and means for cooling and mixing the vapors with air and ozone, substantially as described.

5. In an inhaling apparatus, the combination of a volatilizer comprising a closed vessel for containing a heating fluid or substance, retorts in said vessel for containing the substance to be volatilized, a vapor-collector communicating with said retorts, sieves $d$ of hair between the said retorts and collector, and a combined mixing and cooling vessel comprising a series of compartments having water-trays therein with passages leading to the compartments, a pipe leading from the vapor-collector to one of the compartments, an air-admission pipe leading to the vessel, and a pipe leading into and terminating at the top of the uppermost compartment.

In testimony whereof I have signed my name to this specification in the presence of two subscribing witnesses.

JOHANN WEICHMANN.

Witnesses:
EMIL HENZEL,
G. UBERNDORF.